United States Patent
Dupe et al.

(10) Patent No.: US 12,320,317 B2
(45) Date of Patent: Jun. 3, 2025

(54) PRESSURE MEASUREMENT BAR IMPROVING THE MONITORING OF UNSTEADY AERODYNAMIC PHENOMENA

(71) Applicant: Airbus Operations SAS, Toulouse (FR)

(72) Inventors: Nicolas Dupe, Toulouse (FR); Nicolas Jean, Toulouse (FR); Maxime Keller, Toulouse (FR); Cyrille Dajean, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/442,217

(22) Filed: Feb. 15, 2024

(65) Prior Publication Data
US 2024/0280064 A1 Aug. 22, 2024

(30) Foreign Application Priority Data

Feb. 17, 2023 (FR) ........................... 2301499

(51) Int. Cl.
*G01L 9/00* (2006.01)
*F02K 1/76* (2006.01)

(52) U.S. Cl.
CPC ............ *F02K 1/763* (2013.01); *G01L 9/0001* (2013.01); *F05D 2260/83* (2013.01)

(58) Field of Classification Search
CPC . F01D 21/003; F05D 2260/83; G01L 9/0001; G01L 19/00; G01L 19/0092; G01L 19/147; F02K 1/64; F02K 1/173
See application file for complete search history.

(56) References Cited

U.S. PATENT DOCUMENTS

| | | | |
|---|---|---|---|
| 10,519,801 B2 * | 12/2019 | Giordan | F01D 9/02 |
| 11,099,096 B2 * | 8/2021 | Caturla | F02K 1/64 |
| 2019/0168866 A1 * | 6/2019 | Tovkach | B64U 20/70 |
| 2020/0191676 A1 | 6/2020 | Caturla et al. | |
| 2021/0333099 A1 | 10/2021 | Zhu et al. | |
| 2023/0366783 A1 | 11/2023 | D'Almeida et al. | |

FOREIGN PATENT DOCUMENTS

| | | |
|---|---|---|
| FR | 3090102 A1 | 6/2020 |
| WO | 2018081559 A1 | 5/2018 |
| WO | 2022123143 A1 | 6/2022 |

OTHER PUBLICATIONS

French Search Report and Written Opinion for corresponding French Patent Application No. 2301499 dated Aug. 31, 2023.

* cited by examiner

*Primary Examiner* — David E Sosnowski
*Assistant Examiner* — Maxime M Adjagbe
(74) *Attorney, Agent, or Firm* — Greer, Burns & Crain, Ltd.

(57) ABSTRACT

A measurement bar includes a sheath, a leading edge having a plurality of cavities, a steady pressure sensor generating first data and an unsteady pressure sensor generating second data in each of the cavities, an electronic circuit including the steady pressure sensor and the unsteady pressure sensor of each of the cavities, a processing unit configured to merge the first data and the second data, and a second communication module configured to transmit the first data, the second data and the merged first data and second data to a user device. Thus, it is possible to monitor unsteady aerodynamic phenomena.

8 Claims, 6 Drawing Sheets

PRESSURE MEASUREMENT BAR IMPROVING THE MONITORING OF UNSTEADY AERODYNAMIC PHENOMENA

CROSS-REFERENCES TO RELATED APPLICATIONS

This application claims the benefit of the French patent application No. 2301499 filed on Feb. 17, 2023, the entire disclosures of which are incorporated herein by way of reference.

FIELD OF THE INVENTION

The present invention concerns a pressure measurement bar improving the monitoring of unsteady aerodynamic phenomena.

BACKGROUND OF THE INVENTION

During certain phases of design or maintenance of an aircraft, the engines of the aircraft, in particular turbojet engines, must be tested. These tests require the taking of measurements on the ground and/or in flight at different locations on the engine to be tested. These measurements require instrumentation of the engine, in particular inside the secondary flow path. For this, measurement tools are known which are designed to be installed in an engine to be tested, in particular for measuring pressure, as described in document FR 3 090 102.

These measuring tools may comprise pressure sensors of the micro-electromechanical system type (MEMS) which are able to generate data representative of the pressure measurement. There are steady pressure sensors and unsteady pressure sensors.

The phenomena generally studied from these pressure measurements correspond to unsteady aerodynamic phenomena with variations of around 100 Hz. The MEMS-type sensors have sampling rates smaller than these variations for steady pressure sensors, or larger than these variations for unsteady pressure sensors. Thus, the steady pressure sensors generate data which cannot follow all the variations. The unsteady pressure sensors may generate incorrect data for steady pressures, in particular on sudden temperature variations.

The present measurement tools are therefore not fully satisfactory.

SUMMARY OF THE INVENTION

An object of the present invention is to remedy the drawbacks of the measurement tools of the prior art. To do this, the invention concerns a pressure measurement bar configured to be arranged on a rod situated through a flow path of an aircraft engine.

According to the invention, the measurement bar comprises at least:
  a sheath comprising two side walls which between them delimit a housing configured to receive the rod,
  a leading edge extending over an entire length of the sheath, the leading edge having a plurality of cavities distributed over a length of the leading edge, each of the cavities being hermetically sealed relative to one another,
  for each of the cavities, an air intake forming a fluidic passage between the cavity and the flow path,
  in each of the cavities, a steady pressure sensor configured for generating first data representative of first steady pressure measurements, and an unsteady pressure sensor configured for generating second data representative of second unsteady pressure measurements,
  an electronic circuit running over at least part of the length of the sheath between the sheath and the leading edge, the electronic circuit comprising the steady pressure sensor and the unsteady pressure sensor of each of the cavities,
  a processing unit comprising a first communication module configured to receive the first data and the second data, a merging module configured to merge the first data and the second data, and a second communication module for transmitting the first data, the second data and the merged first data and second data to a user device.

Thus, due to the merger of the data generated both by the steady sensors and the unsteady sensors, it is possible to monitor the variations in unsteady aerodynamic phenomena in a flow path of an aircraft engine.

According to an embodiment, the merging module merges the first data and the second data using an adjustable cross filter.

For example, the adjustable cross filter corresponds to a Kalman filter.

Also, the steady pressure sensor of each of the cavities corresponds to a sensor of the micro-electromechanical system type.

Furthermore, the unsteady pressure sensor of each of the cavities corresponds to a sensor of the micro-electromechanical system type.

Advantageously, the cavities are separated from one another by a distance between 10 mm and 100 mm.

The invention also concerns an aircraft engine, the engine comprising a flow path and at least one movable inversion gate, the inversion gate comprising at least one rod fixed in articulated fashion between the inversion gate and a motor unit, the rod being configured for bringing the inversion gate into a retracted position in which the inversion gate does not extend through the flow path, and a deployed position in which the inversion gate extends through the flow path.

According to the invention, the engine comprises at least one measurement bar as specified above, arranged on at least one rod of the engine, wherein the or each rod is housed in the housing of the at least one measurement bar.

The invention also concerns an aircraft comprising at least one engine as specified above.

BRIEF DESCRIPTION OF THE DRAWINGS

The appended figures clearly show how the invention may be implemented. On the figures, identical references designate similar elements.

DETAILED DESCRIPTION OF THE PREFERRED EMBODIMENTS

Figure 1:
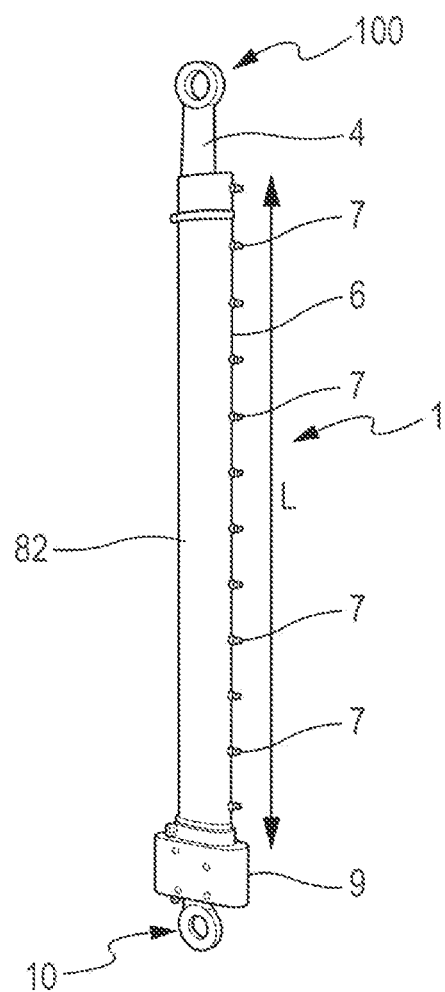
FIG. 1 shows the measurement bar mounted on a rod.
Figure 2:
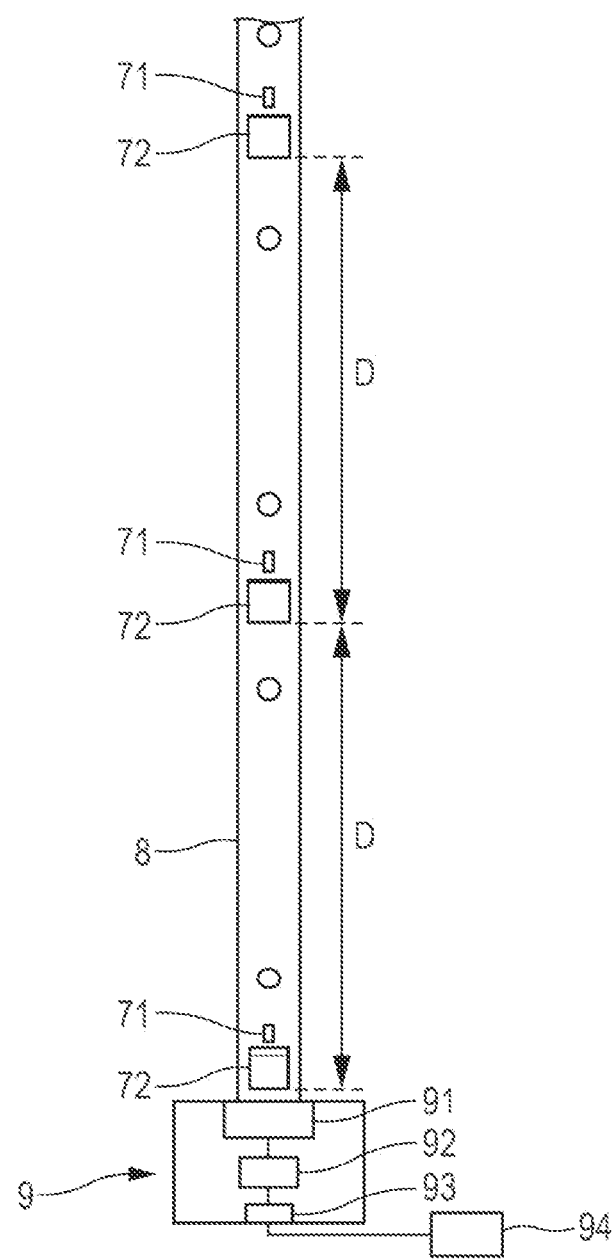
FIG. 2 shows schematically the electronic circuit comprising the unsteady pressure sensors and the steady pressure sensors, and the processing unit.

The measurement bar 1 is shown schematically in FIG. 1 and FIG. 2.

The measurement bar 1 is configured to be fixed to a rod 4 arranged through a flow path 5 (otherwise known as the "secondary flow 5") of an engine 3 of an aircraft AC.

Figure 3:
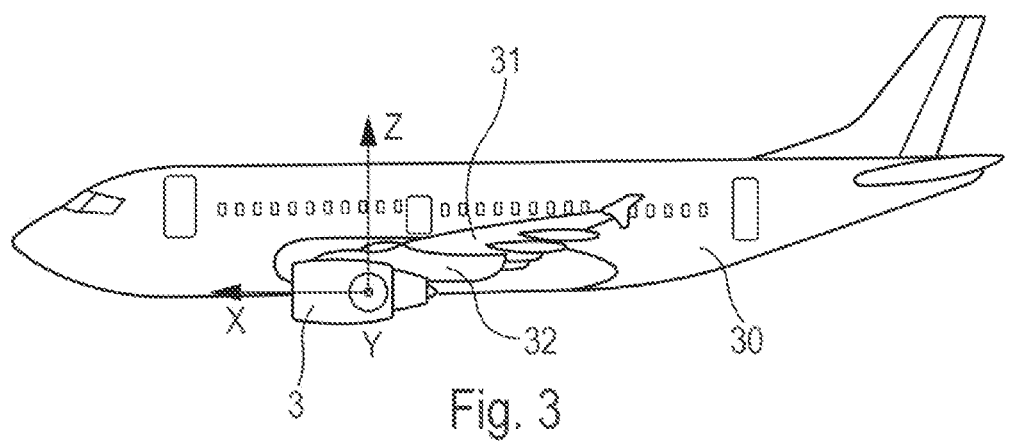
FIG. 3 shows an aircraft comprising an engine having a measurement bar mounted on a rod.

FIG. 3 shows an aircraft AC comprising a fuselage 30 with a wing 31 on either side thereof which carries an engine 3 and a mast 32 for fixing the engine 3 below the wing 31. In the description which follows, the engine 3 more particularly corresponds to a ducted fan turbine engine 3, and a flow path 5 of such a ducted fan turbine engine 3, but may correspond to any engine having a flow path in which the pressure of an air flow F must be measured.

In the description below, X indicates the longitudinal axis of the engine 3 which is parallel to the longitudinal axis of the aircraft AC and oriented positively towards the front of the aircraft AC. Y indicates the transverse axis which is horizontal when the aircraft AC is on the ground. Z indicates the vertical axis when the aircraft AC is on the ground. The three axes X, Y and Z are orthogonal to one another.

Figure 4:
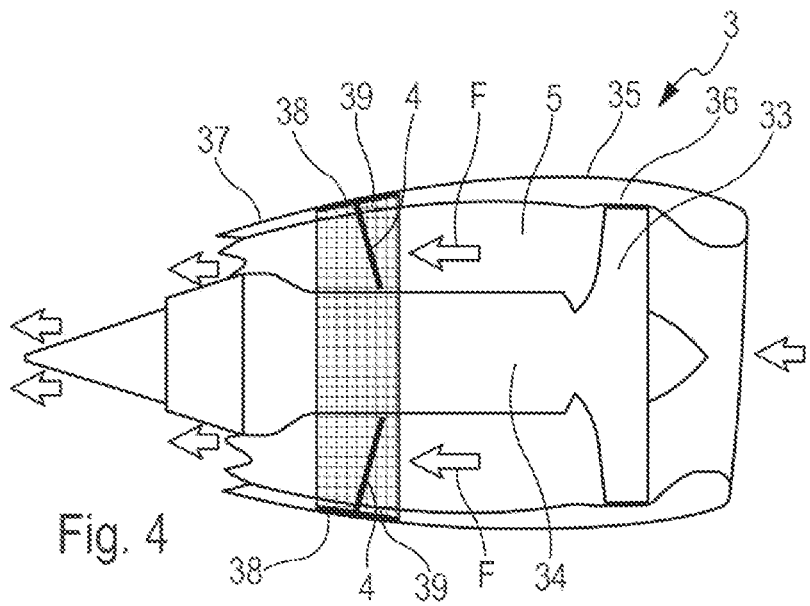
FIG. 4 shows schematically a ducted fan turbine engine comprising an inversion gate in a retracted position.
Figure 5:
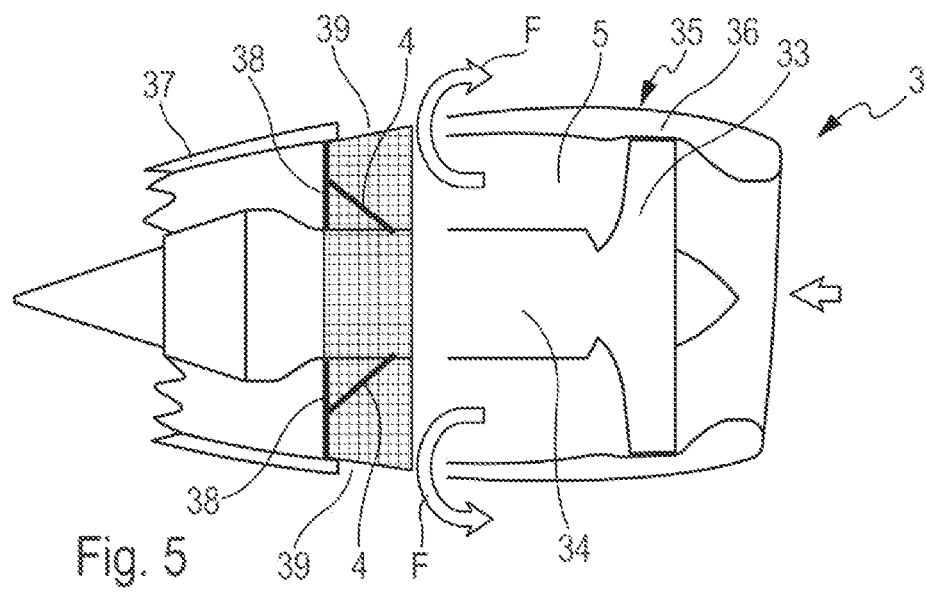
FIG. 5 shows schematically a ducted fan turbine engine comprising an inversion gate in the deployed position.

FIG. 4 and FIG. 5 show an example of a ducted fan turbine engine 3. The ducted fan turbine engine 3 comprises a fan 33, a motor unit 34 forming a hub, and a nacelle 35 arranged around the motor unit 34. The motor unit 34 is placed downstream of the fan 33. A flow path 5 is delimited between the motor unit 34 and the nacelle 35. The air passing through the fan 33 is divided into a primary flow which passes through the motor unit 34, and a secondary flow which passes through the flow path 5. The nacelle 35 comprises a fixed fan housing 36 around the fan 33, and movable cowlings 37 at the rear of the fan housing 36, each of which is movable in translation in a direction globally parallel to the longitudinal axis X of the ducted fan turbine engine 3.

Each movable cowling 37 is movable in translation relative to the motor unit 34 between a forward position (FIG. 4) and a back position (FIG. 5). In the forward position (FIG. 4), the movable cowlings 37 are pressed against the rear of the fan housing 36. In the back position, the movable cowlings 37 are moved back away from the fan housing 36 and spaced from the fan housing 36 so as to open a window 39 between the flow path 5 and the exterior of the nacelle 35. The window 39 is delimited at the front by the fan housing 36 and at the rear by the movable cowlings 37.

The movement of each movable cowling 37 is ensured by any appropriate means such as rails, jacks etc.

The ducted fan turbine engine 3 also comprises a thrust inversion system which comprises at least one inversion gate 38.

Each inversion gate 38 is movable between a retracted position (FIG. 4) and a deployed position (FIG. 5). In the retracted position (FIG. 4), the inversion gate 38 does not extend through the flow path 5 and therefore does not form an obstacle to the passage of the secondary air flow F in the flow path 5. In the deployed position (FIG. 5), the inversion gate 38 extends through the flow path 5 so as to divert the air flow F towards the window 39 which opens between the flow path 5 and the exterior of the nacelle 35.

For each inversion gate 38, the inversion system also comprises a rod 4 which moves the inversion gate 38 from the retracted position to the deployed position when the movable cowling 37 passes from the forward position to the back position. The rod 4 is fixed in articulated fashion between the inversion gate 38 and the motor unit 34.

In the retracted position (FIG. 4), each rod 4 extends through the flow path 5. In the deployed position (FIG. 5), each rod 4 is practically pressed against the motor unit 34.

FIG. 1 shows the rod 4 with an articulation point 10, 100 at each end and covered by a (pressure) measurement bar 1. The measurement bar 1 is more particularly designed to measure pressure when the inversion gate 38 is in the retracted position (FIG. 4).

The rod 4 has an aerodynamic cross-section around which the air of the flow path 5 flows.

The measurement bar 1 comprises a sheath 82 with two side walls 821, 822 which between them delimit a housing 823 in which the rod 4 is configured to be received. The housing 823 communicates with the exterior of the sheath 82 through an opening 824 which extends over at least part of the length L of the sheath 82 between the two side walls 821, 822. The rod 4 is configured to be inserted in the housing 823 via the opening 824.

Figure 10:
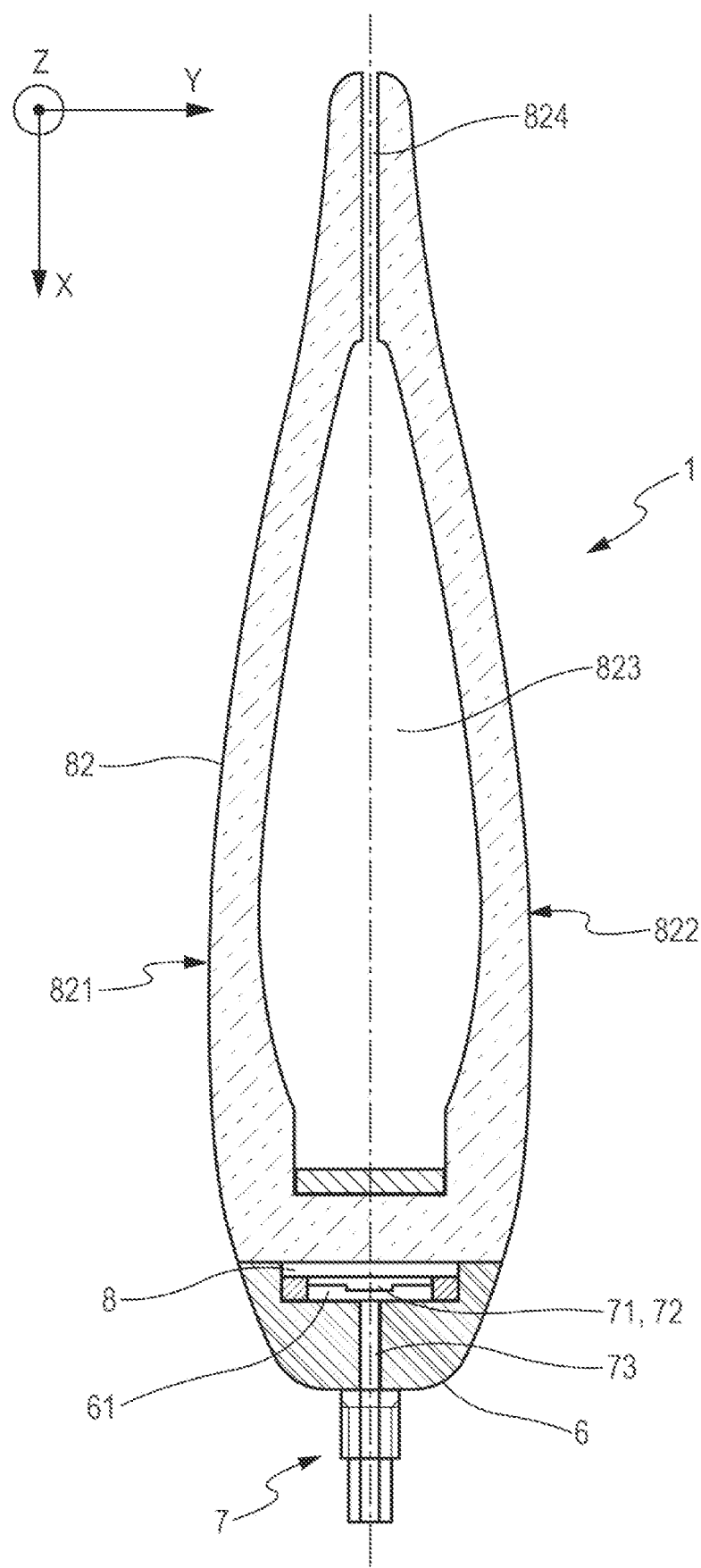
FIG. 10 shows a cross-section through the measurement bar.

The measurement bar 1 also comprises a leading edge 6 extending over a length L of the sheath 82 (FIG. 1 and FIG. 10). The leading edge 6 may correspond to a part attached to the sheath 82. The leading edge 6 may also form an integral part of the sheath 82.

The leading edge 6 has a plurality of cavities 61 distributed over a length L of the leading edge 6. Each cavity 61 is hermetically sealed from another cavity 61.

For each of the cavities 61, the measurement bar 1 comprises an air intake 7 which forms a fluidic passage 73 between the cavity 61 and the flow path 5. Each air intake 7 of the leading edge 6 communicates exclusively with a cavity 61.

In each of the cavities 61, the measurement bar 1 comprises a steady pressure sensor 71 configured for generating first data representative of first steady pressure measurements, and an unsteady pressure sensor 72 configured for generating second data representative of second unsteady pressure measurements.

The steady pressure sensor 71 may have a sampling rate up to 128 measurement points per second, a pass-band extending up to 40 Hz. It has no anti-aliasing filter.

The unsteady pressure sensor 72 may have a sampling rate up to 4096 measurement points per second, a pass-band extending up to 800 Hz. It has an anti-aliasing filter.

The measurement bar 1 also comprises an electronic circuit 8 which runs over the length L of the sheath 82, between the sheath 82 and the leading edge 6. The electronic circuit 8 comprises the steady pressure sensor 71 and the unsteady pressure sensor 72 of each of the cavities 61.

Figure 6:
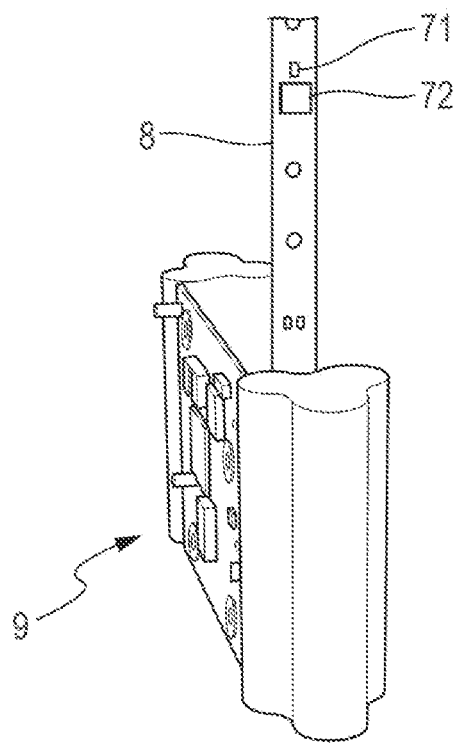
FIG. 6 shows in perspective the processing unit connected to the electronic circuit.

The measurement bar 1 also comprises a data processing unit 9 (FIG. 1, FIG. 2, FIG. 6). The data processing unit 9 comprises a first communication module 91 configured for receiving the first data and the second data, and a merging module 92 configured for merging the first data and the second data.

The merging of the data of a steady sensor 71 and an unsteady sensor 72 allows monitoring of variations in unsteady aerodynamic phenomena in a flow path of the aircraft engine. The use of steady sensors alone, or unsteady sensors alone, would not allow satisfactory monitoring of these variations.

The measurement bar also comprises a second communication module 93 configured for transmitting the first data, the second data and the merged first data and second data to a user device 94. For example, the first data, the second data and the merged first data and second data may be transmitted to the user device 94 via a charging unit when the data processing unit 9 is removably connected to the charging unit.

As a non-limitative example, the user device 94 may correspond to a display device.

The merging module 92 may merge the first data and the second data using an adjustable cross filter.

As a non-limitative example, the adjustable cross filter corresponds to a Kalman filter.

The steady pressure sensor 71 of each of the cavities 61 corresponds to a sensor of the micro-electromechanical system type.

The unsteady pressure sensor 72 of each of the cavities 61 corresponds to a sensor of the micro-electromechanical system type.

Advantageously, the cavities 61 are separated from one another by a distance D between 10 mm and 100 mm, in particular between 40 mm and 60 mm, preferably 50 mm.

Distance D may vary depending on application and/or the desired measurement precision.

Figure 7:
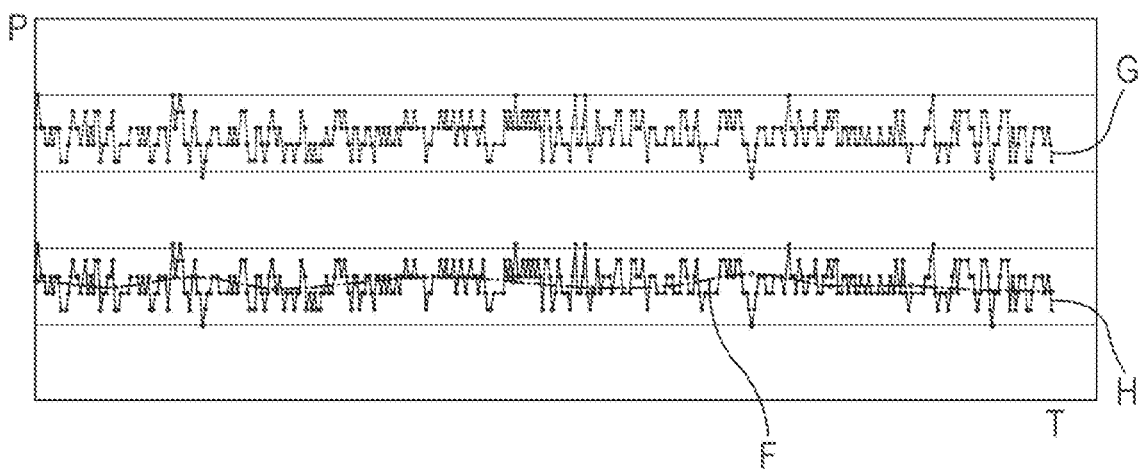
FIG. 7 shows a graph indicating the results of pressure measurements as a function of time during a laboratory test under a constant ambient pressure.
Figure 8:
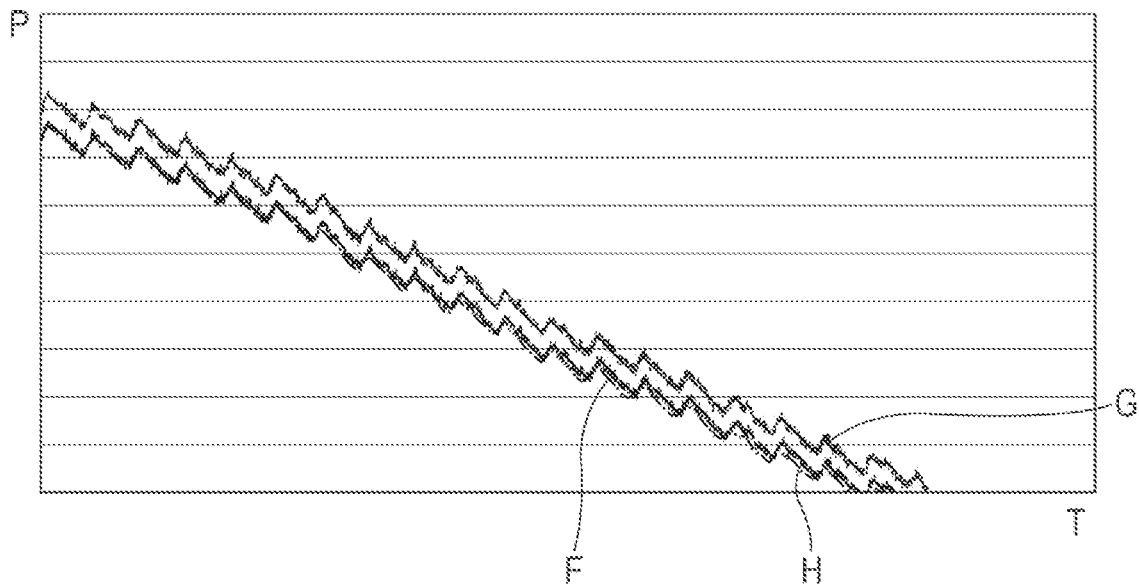
FIG. 8 shows a graph indicating the results of pressure measurements as a function of time during a laboratory test under a pressure having slight variations of the order of 20 Hz.
Figure 9:
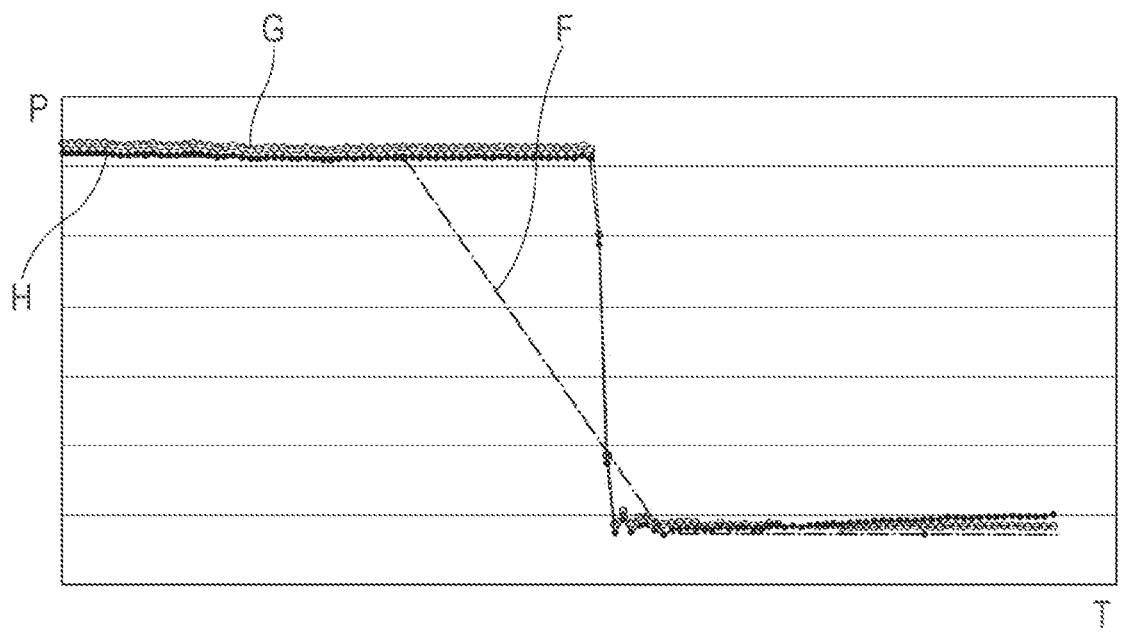
FIG. 9 shows a graph indicating the results of pressure measurements as a function of time during a laboratory test under a pressure with a stage characteristic of an explosive decompression in the closed environment.

FIG. 7, FIG. 8 and FIG. 9 each show a graph indicating the results of pressure measurements P (ordinate axis) as a function of time T (abscissa axis) during laboratory tests under different conditions. Curve F corresponds to the steady pressure measurement data generated by steady pressure sensor 71. Curve G corresponds to the unsteady pressure measurement data generated by the unsteady pressure sensor 72. Curve H corresponds to the result of merging of the pressure measurement data and the unsteady pressure measurement data.

FIG. 7 shows the results of a laboratory test and a constant ambient pressure. FIG. 8 shows the results of a laboratory test under a pressure showing slight variations of the order of 20 Hz. FIG. 9 shows the results of a laboratory test under a pressure showing a stage characteristic of an explosive decompression of a closed environment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure measurement bar configured to be arranged on a rod passing through a flow path of an engine of an aircraft, comprising:
   a sheath comprising two side walls which between them delimit a housing configured to receive the rod,
   a leading edge extending over an entire length of the sheath, the leading edge having a plurality of cavities distributed over a length of the leading edge, each cavity from the plurality of cavities being hermetically sealed relative to each other,
   wherein each cavity from the plurality of cavities form a fluidic passage to the flow path via an air intake,
   in each cavity from the plurality of cavities, a steady pressure sensor configured to generate first data representative of first steady pressure measurements, and an unsteady pressure sensor configured to generate second data representative of second unsteady pressure measurements,
   an electronic circuit running over at least part of the length of the sheath between the sheath and the leading edge, the electronic circuit comprising the steady pressure sensor and the unsteady pressure sensor of each cavity from the plurality of cavities,
   the pressure measurement bar configured to receive the first data and the second data to merge the first data and the second data, and to transmit the first data, the second data and the merged first data and second data to a user device.

2. The measurement bar as claimed in claim 1, wherein the pressure measurement bar is further configured to merge the first data and the second data using an adjustable cross filter.

3. The measurement bar as claimed in claim 2, wherein the adjustable cross filter corresponds to a Kalman filter.

4. The measurement bar as claimed in claim 1, wherein the steady pressure sensor of each of the cavities corresponds to a sensor of a micro-electromechanical system type.

5. The measurement bar as claimed in claim 1, wherein the unsteady pressure sensor of each of the cavities corresponds to a sensor of a micro-electromechanical system type.

6. The measurement bar as claimed in claim 1, wherein each cavity from the plurality of cavities are separated from one another by a distance between 10 mm and 100 mm.

7. An aircraft engine, said aircraft engine comprising:
   a flow path,
   at least one movable inversion gate, said at least one movable inversion gate comprising at least one rod fixed in articulated fashion between the at least one movable inversion gate and a motor unit, said at least one rod being configured to bring the at least one movable inversion gate into a retracted position in which the at least one movable inversion gate does not extend through the flow path, and a deployed position in which the at least one movable inversion gate extends through the flow path,
   at least one measurement bar as claimed in claim 1, arranged on the at least one rod of the aircraft engine, wherein each rod is housed in the housing of the at least one measurement bar.

8. An aircraft comprising at least one engine as claimed in claim 7.

* * * * *